Dec. 2, 1969 K. SCHAEFFER 3,481,270

METHOD FOR PRODUCING WRAPAROUND PLATES

Filed Dec. 7, 1966 2 Sheets-Sheet 1

METHOD FOR PRODUCING WRAPAROUND PLATES

Filed Dec. 7, 1966 2 Sheets-Sheet 2

United States Patent Office 3,481,270

Patented Dec. 2, 1969

3,481,270
METHOD FOR PRODUCING WRAP-AROUND PLATES

Karl Schaeffer, Edgware, Middlesex, England, assignor to Schnellpressenfabrik Koenig & Bauer Aktiengesellschaft, Wurzburg, Germany Filed Dec. 7, 1966, Ser. No. 599,914

Claims priority, application Great Britain, Jan. 17, 1966, 2,186/66; Germany July 1, 1966, Sch 39,192

Int. Cl. B41c *1/12*

U.S. Cl. 101—401.1 3 Claims

ABSTRACT OF THE DISCLOSURE

The present invention relates to a method for producing composite wraparound plates for multicolor printing by mounting at least one original or duplicate printing block in accurate register on each of several flexible carrier shims which, in turn, are mounted on a common registering cylinder from which the completed wraparound plates are subsequently removed for mounting on the printing cylinders of a multicolor printing press.

Figure 1:
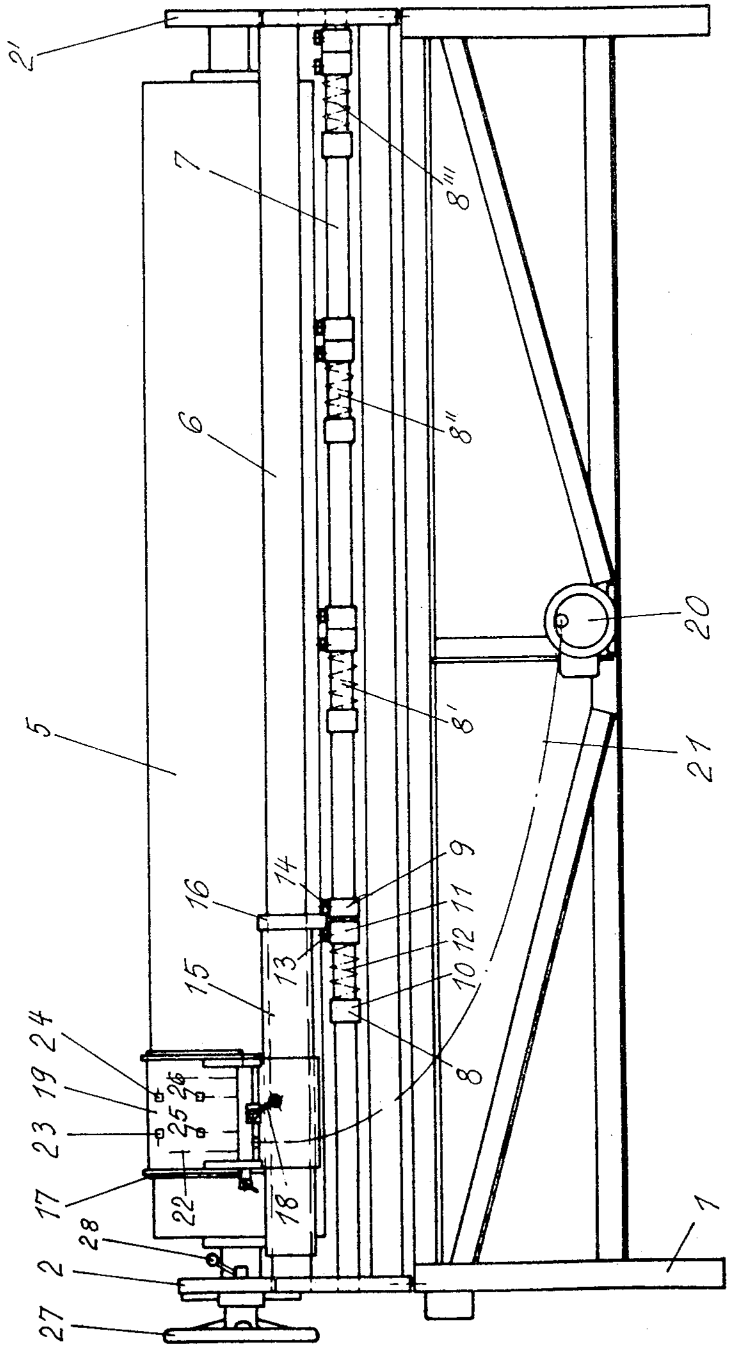

Since wraparound plates which consist of a single piece of material are generally very expensive, it is usually preferred to combine a plurality of individual original or duplicate printing blocks with each other and to mount them on a common carrier shim so as to be in accurate register with the corresponding printing blocks which are mounted on one or more similar carrier shims.

For simple printing work, these individual printing blocks may be glued with sufficient registering accuracy by hand upon each carrier shim so as to form a composite wraparound plate. If, however, for multicolor printing it becomes necessary to produce, for example, four wraparound plates for the different constituent colors, it is almost unavoidable that inaccuracies in registering of the individual printing blocks on each wraparound plate relative to the corresponding printing blocks of the other wraparound plates will occur if these printing blocks are simply mounted and aligned by hand on each carrier shim. Various efforts have therefore been made to improve the accuracy of registering of the printing blocks of composite wraparound plates by means of special auxiliary devices. However, the devices which have so far been proposed for this purpose can also be employed only for producing wraparound plates for relatively simple printing work and not for multicolor printing of the highest accuracy.

It is an object of the present invention to provide a very simple and economical method for producing wraparound plates for the most complicated and accurate printing work by orienting and mounting on the single carrier shim of each of a plurality of wraparound plates at least one and preferably a plurality of flexible printing blocks in such a manner that the registering points of all corresponding blocks on several carrier shims will be located in identical positions on each carrier shim.

According to the present invention, this object is attained by mounting, for example, four carrier shims for a four-color printing job laterally adjacent to each other on a common registering cylinder, adjusting four stop units on a rod extending parallel to the registering cylinder to their proper positions relative to the carrier shims on the registering cylinder, securing a transparent proof of the particular printing job to the concave inner side of a transparent, arcuately curved mounting plate of a register-transfer unit which is mounted on, slidable along and adapted to be locked to a guide bar which also extends parallel to the register cylinder, applying a first printing block upon the concave side of the proof and holding it attached thereto by a pump-produced suction of a sufficient strength so as still to permit the printing block to be shifted by hand relative to the proof to a position in which it is in exact register with the proof, then firmly connecting the printing block to the proof by applying the full suction of the suction pump, moving the register-transfer unit along the guide bar into engagement with the first stop unit and locking it thereto, pivoting the curved mounting plate of the register-transfer unit in this locked position toward and against the register cylinder so as to secure the printing block securely upon the first carrier shim by means of adhesive tape on the printing block, then releasing the suction to disengage the printing block from the proof, pivoting the curved mounting plate away from the registering cylinder and unlocking it from the first stop unit, applying a second printing block upon the same proof on the curved mounting plate and registering it with the proof and then securing it upon the second carrier shim in the same manner as described with reference to the first printing block, and then proceeding in the same manner successively with the third and fourth printing blocks so as to secure them on the third and fourth carrier shims in register with the same proof. If one or more additional printing blocks are to be secured to each carrier shim, the first proof is then removed from the curved mounting plate on the register-transfer unit and another proof is secured thereto and another series of printing blocks is then successively applied upon and registered with this second proof and secured to the four carrier shims adjacent to the first series of printing blocks in the same manner as previously described. For adjusting the individual proofs also to the proper positions on the carrier shims in the peripheral direction thereof, the registering cylinder may be turned about its axis and then be locked in a fixed position. When all of the printing blocks for the different colors are secured to the carrier shims in proper register with their respective proofs, the completed wraparound plates may be removed from the registering cylinder and mounted on the different printing cylinders of a four-color printing press for the subsequent printing operations.

Figure 2:
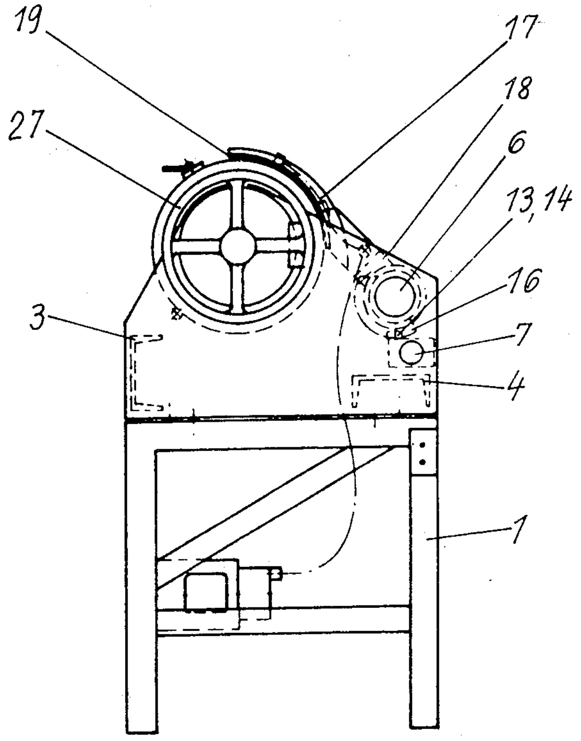

The features and advantages of the present invention will become more clearly apparent from the following detailed description thereof which is to be read with reference to the accompanying drawings, in which:

FIGURE 1 shows partly diagrammatically a front view of the apparatus according to the invention, while FIGURE 2 shows an end view of the apparatus, as seen from the left side of FIGURE 1.

As illustrated in the drawings, the apparatus according to the invention comprises a frame 1 and a pair of upright side plates 2 and 2′ which are mounted on the ends of this frame and are rigidly connected to each other by connecting bars 3 and 4. These side plates 2 and 2′ carry coaxial bearings for rotatably mounting a registering cylinder 5 which may be turned about its axis by a hand wheel 27 and may be locked in fixed positions by a lever 28. Side plates 2 and 2′ further support a guide bar 6 and a rod 7, both of which extend parallel to cylinder 5. Rod 7 carries four stop units 8, 8′, 8″, and 8‴ each of which consists of two setting rings 9 and 10 which are adjustable on and adapted to be secured to rod 7, and of a sliding sleeve 11 which is acted upon by a spring 12 so as to be pressed against the setting ring 9. The sliding ring 11 and the setting ring 9 carry a pair of rollers 13 and 14, the axes of which extend parallel to each other and within the same plane vertically to the axis of rod 7. Guide bar 6 supports a guide tube 15 which is slidable thereon easily but without play. This guide tube 15 is provided at one end with a stop flange 16 which extends only around a part of the periphery of the guide tube and has such a width that, when guide tube 15 is turned about its longitudinal axis on guide bar 6, this flange 16 can enter between the rollers 13 and 14 only if the sliding sleeve 11 is withdrawn slightly from setting ring 9 against the action of spring 12. Guide tube 15 together with its stop flange 16 may in this manner be accurately locked in a fixed position relative to the setting ring 9 of one of the stop units 8, 8′, 8″, and 8‴ and be unlocked from this position and shifted along guide bar 6 into locking engagement with any of the other stop units on rod 7, and it may also be shifted back and accurately locked in one of the former positions.

Guide tube 15 carries a register-transfer unit which is slidable along guide tube 15 and adapted to be locked thereto in any desired position along the length thereof by means of a locking lever 18. This register transfer unit comprises a transparent, arcuately curved mounting plate 19 which is mounted on a pair of arms 17 so as to be pivotable on guide tube 15 relative to the registering cylinder 5. It may also be locked in a pivoted position away from cylinder 5. The concave inner side of this transparent mounting plate 19 is adapted to receive a transparent proof sheet, not shown, on which registering points are marked and which may be removably secured to mounting plate 19 by adhesive tape. When the mounting plate 19 is pivoted away from the registering cylinder 5, a flexible or pre-curved printing block, not shown, is applied upon the concave side of mounting plate 19 and held thereon by suction of such a strength that the printing block may still be shifted relative to the proof sheet. For this purpose, the mounting plate 19 and the transparent proof sheet are provided with a plurality of apertures 23, 24, 25, and 26 which are connected by conduits, as indicated by the line 21, to a suction pump 20, the suction of which may be varied by a control valve, not shown. The printing block is then shifted by hand on the transparent proof sheet until it is in accurate register therewith. Before the printing block is applied upon the proof sheet or at least before it is accurately adjusted thereon, adhesive tape which is coated with an adhesive on both sides is firmly attached to the printing block. The side of this tape facing the cylinder 5 is provided with an easily removable cover strip to protect the adhesive thereon and also to protect the hands of the operator from sticking to the adhesive while he adjusts the printing block into registering alignment with the proof sheet. After this has been done, the full suction of pump 20 is applied upon the printing block by another actuation of the control valve so as to attach the properly registered printing block firmly to the proof sheet on the mounting plate 19. The cover strip is then pulled off the adhesive strip on the printing block and the mounting plate 19 is pivoted toward the registering cylinder 5 so as to press the printing block against the first of four carrier shims, not shown, which are removably mounted adjacent to each other on the registering cylinder 5. The registered printing block is thus firmly secured to the first carrier shim. The suction control valve is then shut off so as to permit the curved mounting plate 19 to be pivoted away from the printing block on the first carrier shim. Guide tube 15 is then unlocked from guide bar 6 and turned about the latter to disengage the stop flange 16 from the first stop unit 8. The entire register-transfer unit including the guide tube 15 is then shifted toward the right along guide bar 6 and guide tube 15 is turned back so as to insert and lock the stop flange 16 between the setting ring 14 and the sliding sleeve 13 of the next stop unit 8′ after sleeve 13 has been slightly withdrawn against the action of spring 12. Another printing block for the next color is then applied upon and registered with the same proof sheet on the transparent mounting plate 19 and secured to the second carrier shim in the same manner as it was previously done with the first printing block. Thereafter two further printing blocks are successively applied upon and registered with the proof sheet and secured to the last two carrier shims in the same manner as described after the register-transfer unit has been unlocked from its previous position and shifted to and locked in its next position. If one or more additional printing blocks are to be secured to each carried shim on cylinder 5, the first transparent proof sheet may then be removed from the curved mounting plate 19 and replaced by a proof sheet for another printing job, and another set of printing blocks may be successively applied upon and registered with this second proof sheet and secured to the same carrier sheets adjacent to the printing blocks for the first printing job either in the same or the reverse order of succession as previously described with reference to the first set of printing blocks. Depending upon the dimensions of the printing blocks and the number of sets required, this procedure may be continued until the space on all carrier shims is utilized as economically as possible and covered with several sets of printing blocks for different four-color printing jobs, all of which are accurately registered with their respective proof sheets. When the four wraparound plates for the different colors of several printing jobs are thus completed they may be removed from the registering cylinder and be transferred to the different printing cylinders of a rotary printing press for the following printing operations.

While the mounting plate 19 of the register-transfer unit may be repeatedly shifted back and forth in the longitudinal direction of the registering cylinder 5 and locked in the same accurately fixed positions relative to the carrier shims for the different colors by the stop flange 16 and the stop units 8, 8′, 8″, and 8‴, the printing blocks may also be accurately adjusted in the peripheral direction of the carrier shims by releasing the locking lever 28, then turning the registering cylinder 5 about its axis to the desired position, and thereafter again tightening the locking lever 28.

It is evident from the foregoing description that the method and apparatus according to the invention permit a very economic production of wraparound plates with the maximum number of accurately registered printing blocks for different four-color printing jobs. Since the invention also permits these printing blocks to be very thin, to consist of different materials, and to be either flexible or substantially rigid and pre-curved, and since the carrier shims may also consists of any desired materials, it is now possible to produce very inexpensive wraparound plates of the highest accuracy.

Having thus fully disclosed my invention, what I claim is:

1. A method of producing wraparound plates for multicolor printing comprising at first removably securing several carrier shims in accordance with the number of colors to be printed adjacent to each other on a cylinder, and securing at least one printing block to each carrier shim by removably securing at least one flexible transparent proof upon the concave side of an arcuately curved transparent mounting plate facing said cylinder while said mounting plate is pivoted away from said cylinder, and further comprising the steps of moving said mounting plate in the longitudinal direction along said cylinder and, if necessary, also turning said cylinder about its axis relative to said mounting plate so as to move said mounting plate to a position in which it faces the place on one of said carrier shims on which at least one printing block is to be secured so as to form a complete wraparound plate, applying by hand and connecting by suction a printing block upon the concave side of each proof on said mounting plate and accurately registering said printing block with said proof by shifting it by hand relative to said proof, pivoting said mounting plate toward said cylinder so as to secure the registered printing block by an adhesive upon said carrier shim, releasing the suction on said printing block so as to release the same from said mounting plate, pivoting said mounting plate with said proof thereon away from said secured printing block, and then moving said mounting plate in said longitudinal direction successively to each of the following carrier shims and repeating said steps so as to secure at least one further printing block to each of said following carrier shims after it has been registered with its proof on said mounting plate, and finally removing the completed wraparound plates from said cylinder.

2. A method of producing wraparound plates for multicolor printing comprising at first removably securing several carrier shims in accordance with the number of colors to be printed adjacent to each other on a cylinder, removably securing a first flexible transparent proof upon the concave side of an arcuately curved transparent mounting plate facing said cylinder while said mounting plate is pivoted away from said cylinder, and further comprising the steps of moving said mounting plate in the longitudinal direction along said cylinder and if necessary, also turning said cylinder about its axis relative to said mounting plate so as to move said mounting plate to a position in which it faces the place on one of said carrier shims on which a printing block is to be secured so as to form a complete wraparound plate, locking said mounting plate in said position so as to be immovable in said longitudinal direction, applying by hand and connecting by suction a printing block upon the concave side of said proof on said mounting plate and accurately registering said printing block with said proof by shifting it by hand relative to said proof, pivoting said mounting plate toward said cylinder so as to secure the registered printing plate by an adhesive upon said carrier shim, releasing the suction on said printing block so as to release the same from said mounting plate, pivoting said mounting plate with said proof thereon away from said secured printing block, unlocking said mounting plate, and then moving said mounting plate in said longitudinal direction successively to each of the following carrier shims and repeating said steps so as to secure another printing block to each of said following carrier shims after it has been registered with said proof on said mounting plate, and finally removing the completed wraparound plates from said cylinder.

3. A method as defined in claim 2, further comprising the steps of securing adhesive tape to the free side of each printing block by pressing the uncovered side of said tape having an adhesive coating on each side and a protective cover on one side upon the free side of each printing block and, after said printing block has been registered with said proof on said mounting plate, removing said cover from said tape so as to secure said printing block to one of said carrier shims when said mounting plate is pivoted toward said cylinder and pressed upon said carrier shim.

References Cited

UNITED STATES PATENTS

| | | | |
|---|---|---|---|
| 2,679,695 | 6/1954 | Bungay | 101—401.1 X |
| 2,907,274 | 10/1959 | Taylor | 101—401.1 |
| 2,984,910 | 5/1961 | La Cour | 101—401.1 X |
| 3,160,096 | 12/1964 | Norton | 101—401.1 |

FOREIGN PATENTS

| | | |
|---|---|---|
| 908,431 | 10/1962 | Great Britain. |

ROBERT E. PULFREY, Primary Examiner

F. FREI, Assistant Examiner

U.S. Cl. X.R.

33—184.5; 101—211